United States Patent
Kim

(10) Patent No.: US 11,191,018 B2
(45) Date of Patent: Nov. 30, 2021

(54) CONTROL METHOD OF BEACON RECEIVING TIME AND STATION USING THE METHOD

(71) Applicant: Dialog Semiconductor Korea Inc., Seoul (KR)

(72) Inventor: Won Man Kim, Seoul (KR)

(73) Assignee: Dialog Semiconductor Korea Inc., Seoul (KR)

( * ) Notice: Subject to any disclaimer, the term of this patent is extended or adjusted under 35 U.S.C. 154(b) by 0 days.

(21) Appl. No.: 16/744,461

(22) Filed: Jan. 16, 2020

(65) Prior Publication Data
US 2021/0211979 A1     Jul. 8, 2021

(30) Foreign Application Priority Data

Jan. 16, 2019    (KR) .................. 10-2019-0005481

(51) Int. Cl.
*H04W 52/02*     (2009.01)
*H04W 56/00*     (2009.01)

(52) U.S. Cl.
CPC ... *H04W 52/0212* (2013.01); *H04W 52/0229* (2013.01); *H04W 56/0055* (2013.01)

(58) Field of Classification Search
None
See application file for complete search history.

(56) References Cited

U.S. PATENT DOCUMENTS

| | | | | |
|---|---|---|---|---|
| 2013/0034004 A1* | 2/2013 | Mannemala | ...... | H04W 52/0229 370/252 |
| 2013/0044658 A1* | 2/2013 | Zhu | .................. | H04W 56/0035 370/311 |
| 2013/0272180 A1* | 10/2013 | Hiremath | ............ | H04W 52/029 370/311 |
| 2014/0376432 A1* | 12/2014 | Smith | ............... | H04W 52/0206 370/311 |
| 2018/0020407 A1* | 1/2018 | Emmanuel | ......... | H04N 5/23203 |

FOREIGN PATENT DOCUMENTS

KR     2007-0105731     10/2007

OTHER PUBLICATIONS

Korean Office Action, Application No. 10-2019-005481, Applicant: Dialog Semiconductor Korea Inc., dated Apr. 28, 2020, 4 pages.

\* cited by examiner

*Primary Examiner* — Anh Vu H Ly
(74) *Attorney, Agent, or Firm* — Saile Ackerman LLC; Stephen B. Ackerman

(57) ABSTRACT

A control method of beacon receiving time performed in a station that includes a receiving stage, receiving a first beacon n times from an access point (AP), and n is a natural number greater than or equal to 1; a computing stage, computing a first waiting time of a difference between a station wake-up time for receiving the first beacon and a receiving time of the first beacon every time of the n times of receiving; a deriving stage, deriving a representative value out of the n first waiting times; and a setting stage, setting a sum of a first beacon interval and the representative value of the first waiting times as a first wake-up interval of the station.

12 Claims, 10 Drawing Sheets

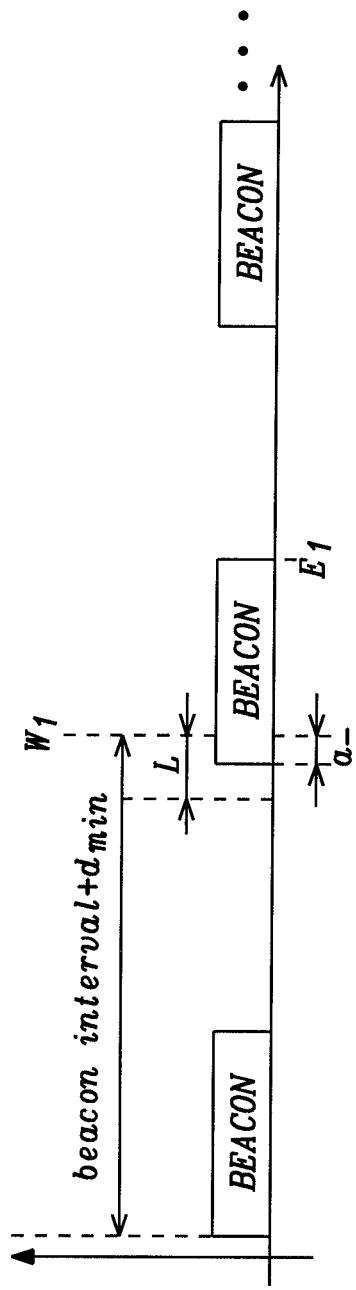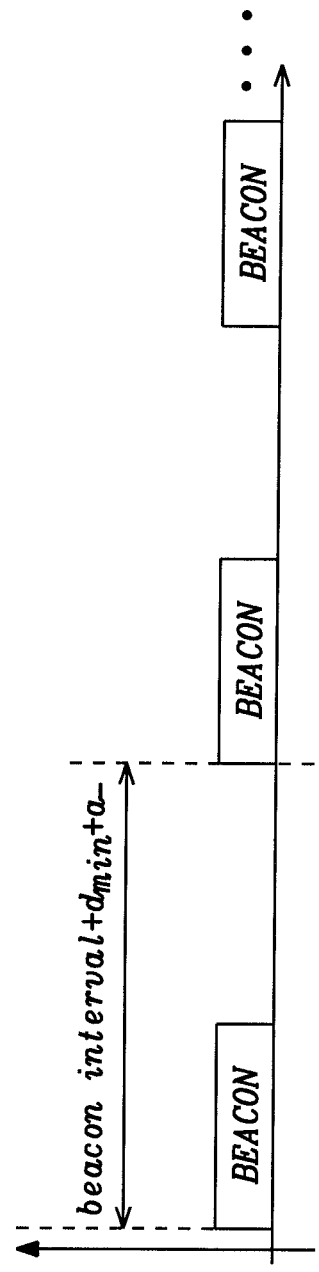
FIG. 10A
FIG. 10B

CONTROL METHOD OF BEACON RECEIVING TIME AND STATION USING THE METHOD

CROSS-REFERENCE TO RELATED APPLICATIONS

This application claims priority to Korean Patent Application No. 10-2019-0005481, filed on Jan. 16, 2019, which application is hereby incorporated herein by reference.

TECHNICAL FIELD

The present disclosure in some embodiments relates to a control method of beacon receiving time and a station using the method, and more particularly to a control method of beacon receiving time that dynamically adjusts a station wake-up time to a time corresponding to beacon receiving and therefore increases energy efficiency and ensures stable beacon receiving, and a station using the method.

BACKGROUND

The statements in this section merely provide background information related to the present disclosure and do not necessarily constitute prior art.

With development of information communication technology, various wireless communication technologies are developing. Herein, wireless local area network (WLAN), as shown in FIG. 1, is a wireless communication technology based on a wireless frequency technology that uses stations 100 such as smart phones, tablet PCs, laptop computers, etc. to make home, enterprises, or specific services provide areas where one can wirelessly connect to the Internet.

In an environment of WLAN, stations 100 receive beacons periodically transmitted from an access point (AP) 110 to maintain a wireless network. Therefore, the stations 100 need to precisely and stably receive beacons for wireless communication. Meanwhile, a conventional method of beacon transmitting and receiving between the AP 110 and the stations 100 is shown in FIG. 2.

As shown in FIG. 2, when the stations 100 receive beacons from the AP 110 in an active mode, the stations 100 use a time stamp and a beacon interval included in received beacons' frame to predict a transmitting time of a next beacon, and for electricity efficiency, operate in a sleep mode to the predicted time.

The stations 100 operating in the sleep mode switch to the active mode again at the predicted time or at any time before the predicted time to prepare to receive a next beacon. Herein, the stations 100 operate in the active mode before the predicted time for the purpose of stably receiving a next beacon.

The stations 100 consume low power and can stably receive beacons through repeatedly performing a process of the active mode and the sleep mode.

However, as shown in FIG. 2, various reasons such as wireless communication condition between the AP 110 and the stations 100, time stamp processing methods of the AP 110, etc. lead to that transmitting interval of beacons transmitted from the AP 110 may be different from the interval predicted by the stations 100.

For example, for the above-mentioned reasons, a beacon delay phenomenon of transmitted beacons may occur after the time predicted by the stations 100. Under this condition, waiting time of the stations 100 is relatively increased for receiving the beacons and a problem of more power consumption occurs.

For another example, for the above-mentioned reasons, a beacon forward phenomenon may occur before the time predicted by the stations 100. Under the condition that a beacon forward phenomenon occurs, the stations 100 may be unable to receive the beacons transmitted from the AP 110.

The beacons may include necessary information or other information such as information used for realizing wireless communication between the AP 110 and the stations 100, and data for notifying the stations 100 that there is information required to receive. Therefore, a beacon forward phenomenon would produce a wireless communication obstacle between the AP 110 and the stations 100.

In order to resolve the latter problem, a method to make the stations 100 reserve a sufficient waiting time being switched to the active mode may be considered. However, as mentioned above, increasing of waiting time would increase power consumption and therefore this method cannot be a satisfactory solution.

SUMMARY

Accordingly, a new control method that can increase power efficiency of the stations 100 required receiving beacons while stably receiving or ensuring beacons is in urgent need.

The present disclosure in some embodiments is to provide a method that makes a wake-up interval of a station be dynamically consistent with a real transmitting time of beacons, and therefore increases power efficiency and stably receives beacons.

In accordance with at least one embodiment, the present disclosure provides a control method of beacon receiving time performed in a station that includes a receiving stage, receiving a first beacon n times from an access point (AP), and n is a natural number greater than or equal to 1; a computing stage, computing a first waiting time of a difference between a station wake-up time for receiving the first beacon and a receiving time of the first beacon every time of the n times of receiving; a deriving stage, deriving a representative value out of the n first waiting times; and a setting stage, setting a sum of a first beacon interval and the representative value of the first waiting times as a first wake-up interval of the station.

According to another embodiment, the present disclosure provides a station that includes a receiving part configured to receive a first beacon n times from an access point (AP), and n is a natural number greater than or equal to 1; a computing part configured to compute a first waiting time of a difference between a station wake-up time for receiving the first beacon and a receiving time of the first beacon every time of the n times of receiving; a deriving part configured to derive a representative value out of the n first waiting times; and a setting part configured to set a sum of a first beacon interval and the representative value of the first waiting times as a first wake-up interval of the station.

As mentioned above, according to an embodiment of the present disclosure, the wake-up interval of the station is precisely in consistent with a real transmitting interval of beacons, and therefore the waiting time used for receiving the beacons is increased and power efficiency of the station is increased.

Furthermore, according to another embodiment of the present disclosure, beacons transmitted from the AP can be stably received, and therefore a stable wireless communication environment between the AP and the station can be formed.

DESCRIPTION OF DRAWINGS

FIGS. 10A and 10B are diagrams illustrating a station required to be previously woke up at a time before its wake-up time, for a negative second waiting time, according to the present disclosure."

DETAILED DESCRIPTION

Figure 1:
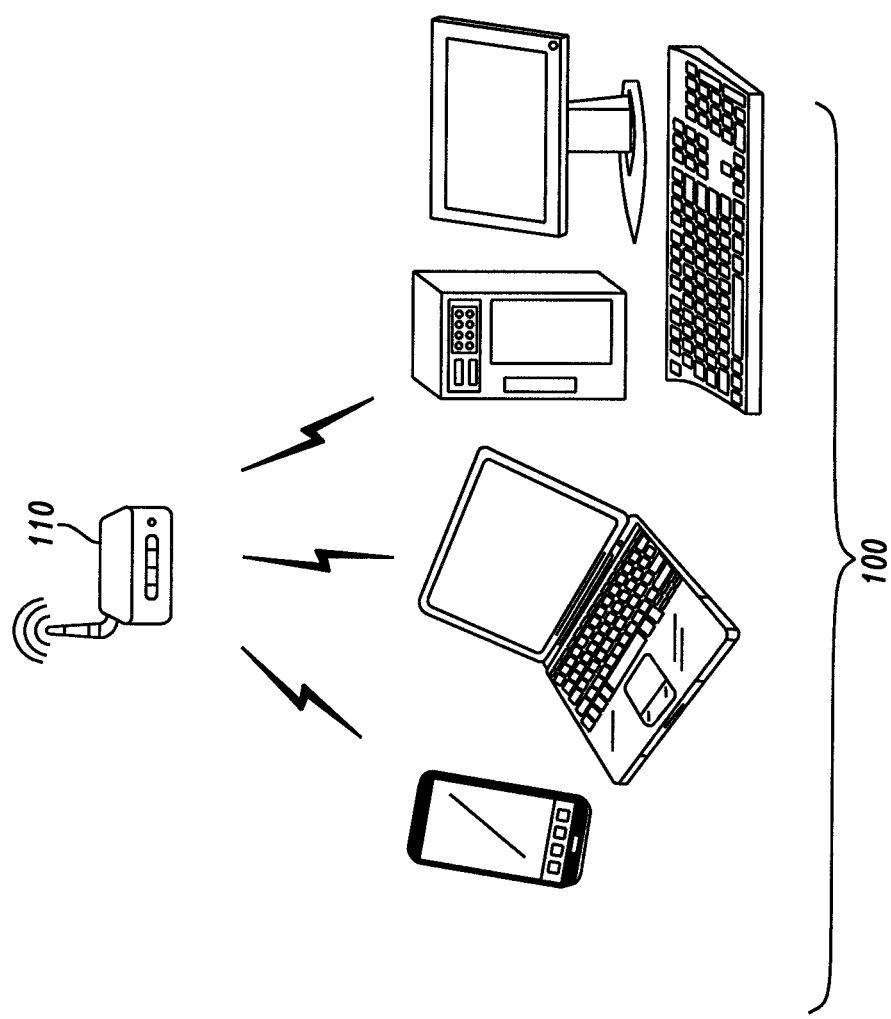
FIG. 1 is an exemplary diagram of a wireless local area network (WLAN) formed by an access point (AP) and stations.
Figure 2:
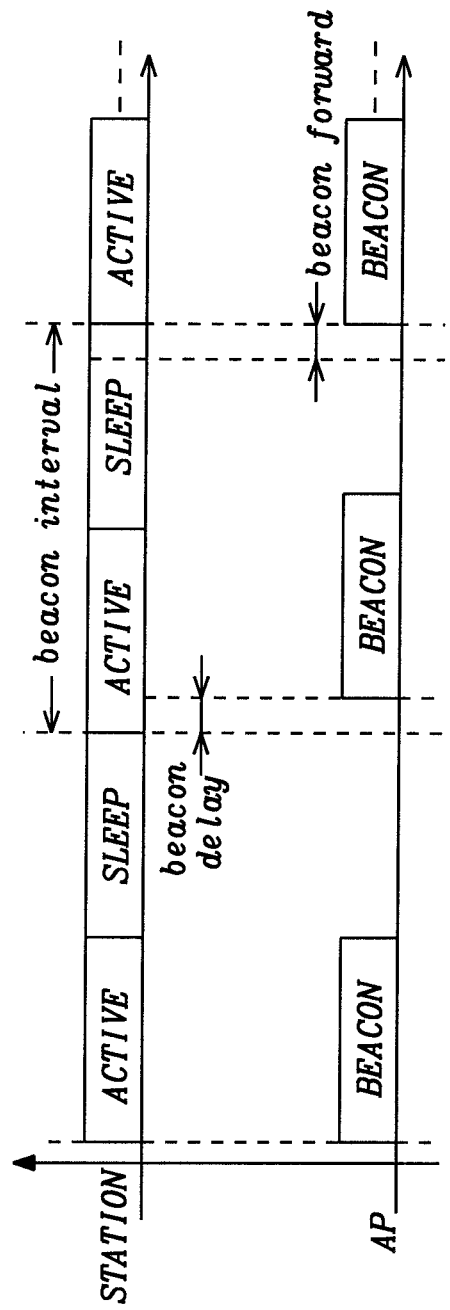
FIG. 2 is an exemplary diagram illustrating a conventional method of transmitting and receiving beacons between an AP and a station.

Hereinafter, at least one embodiment of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, i), ii), a), b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary. The terms such as "unit," "module," and the like refer to one or more units for processing at least one function or operation, which may be implemented by hardware, software, or a combination particular.

The detailed description, which will be given below with reference to the accompanying drawings, is intended to explain exemplary embodiments of the present disclosure and is not intended to represent the only embodiments in which the present disclosure may be practiced.

Figure 3:
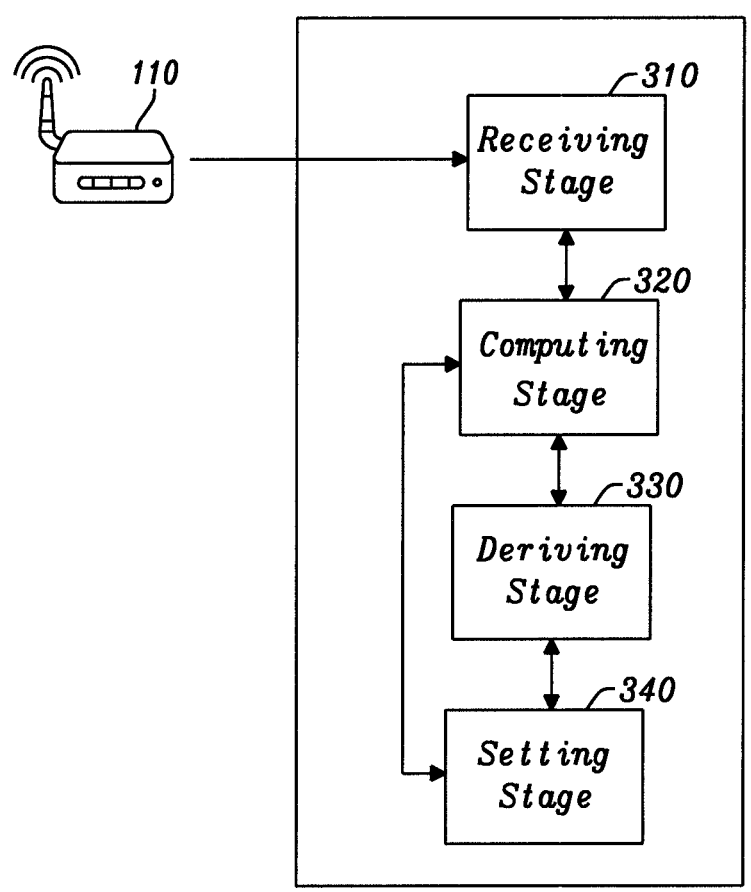
FIG. 3 is a component block diagram briefly illustrating a station according to an embodiment of the present disclosure.
Figure 4:
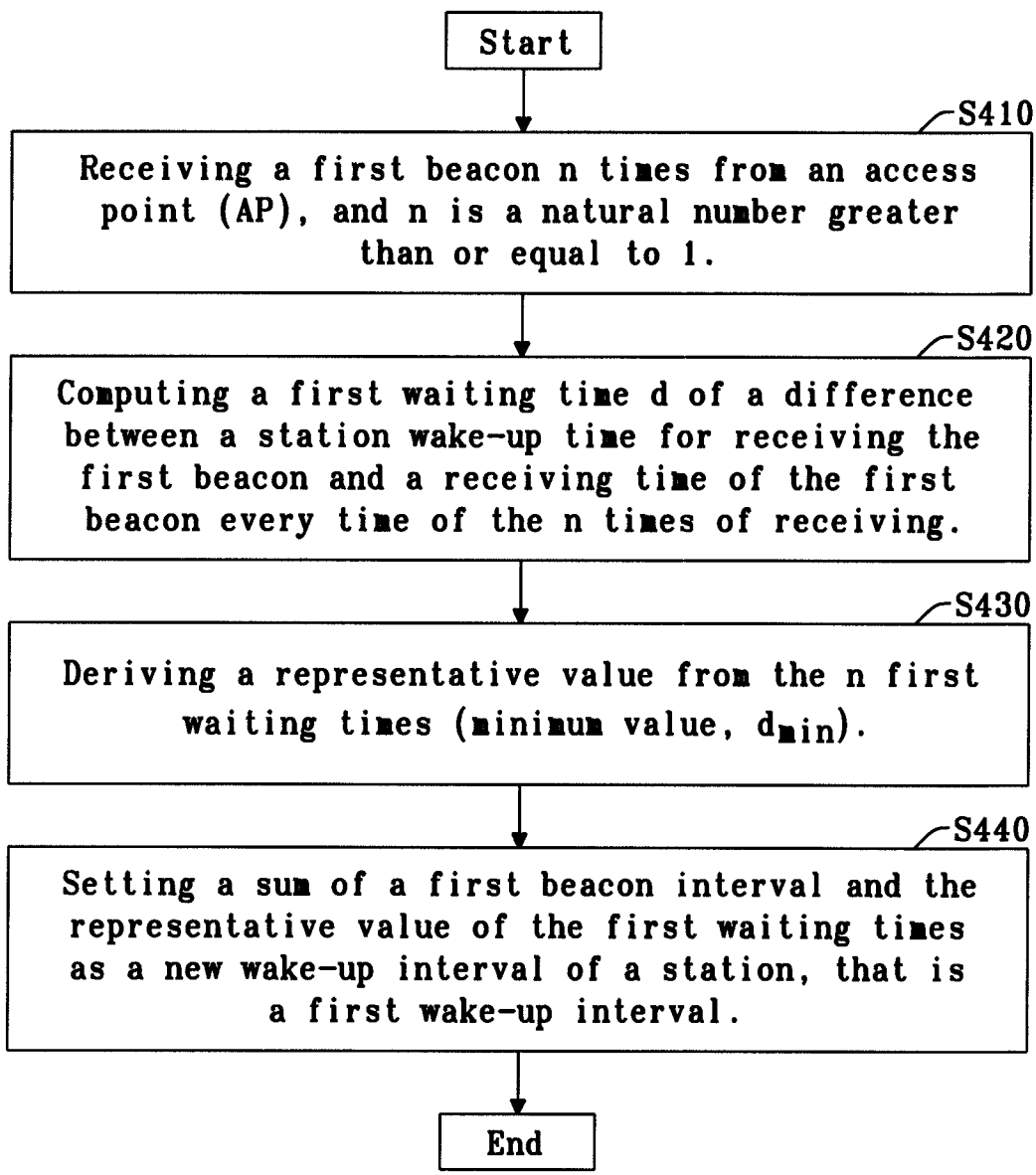
FIG. 4 is a flowchart of a method of making a wake-up interval of a station consistent with a beacon interval according to an embodiment of the present disclosure.

FIG. 3 is a component block diagram briefly illustrating a station 100 according to an embodiment of the present disclosure. FIG. 4 is a flowchart of a method of making a wake-up interval of a station 100 in consistent with a beacon interval according to an embodiment of the present disclosure. FIG. 5 is a diagram illustrating the embodiment shown in FIG. 4.

The following, referring to FIG. 3-FIGS. 5A, 5B, 5C, illustrates technical features of the present disclosure that dynamically adjusts a wake-up interval of the station 100 and makes it be consistent with a beacon interval.

As shown in FIG. 3, the station 100 according to the present disclosure includes a receiving part 310, a computing part 320, a deriving part 330, and a setting part 340. First, the receiving part 310 according to the present disclosure receives a same beacon by preset n times from an access point (AP) 110 (S410).

The preset n times of the beacon received by the station 100 is regarded as a number sufficient to precisely ensure a real receiving time of the beacon. The preset number of times can be modified according to repeated tests, user's intentions, etc., and is a natural number greater than or equal to 1.

On the one hand, regarding to through FIG. 6-FIG. 10 and the following modifying a waiting time, in order to distinguish a difference between the beacon received by n times and modifying a waiting time, and a same beacon received by a same preset times (k times), the beacon received by n times is referred as a first beacon, and the beacon received by k times to modify a waiting time is referred as a second beacon.

Figure 5A:
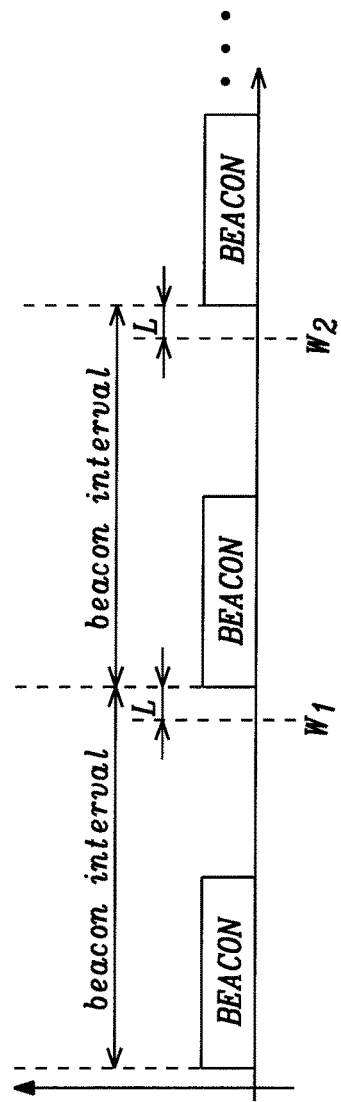
FIGS. 5A, 5B, 5C are diagrams illustrating the embodiment shown in FIG. 4.

According to an embodiment, the station 100 according to the present disclosure, in order to more precisely ensure a receiving time of the first beacon, as shown in FIG. 5A, can be waked up at a time W before a time equivalent to a first beacon interval (predicted as a time of receiving the first beacon), thereby waiting for receiving of the first beacon. A time stamp and/or the first beacon interval included in the first beacon's frame can be used to ensure the predicted time of receiving the first beacon.

The station 100 according to the present disclosure is woke up before a predicted time of receiving the first beacon by an amount of L to wait for receiving of the first beacon, which can not only ensure a delay receiving of the first beacon, but also ensure a forward receiving of the first beacon, and is used in setting of a waiting time.

Under this embodiment, the present disclosure can set the time W of waking up the station 100 as a virtual beacon interval (new baseline) to perform the following described process, and the following description is centered on this embodiment.

Figure 5B:
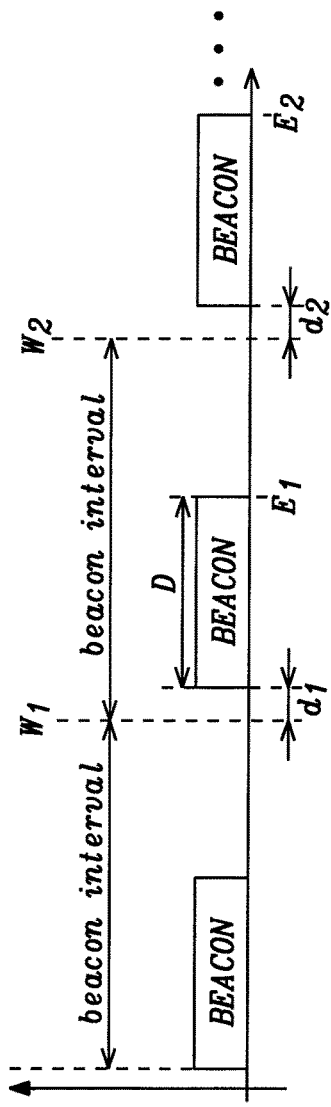

In a process of the receiving part 310 according to the present disclosure receiving the first beacon n times from the AP 110, as shown in FIG. 5B, there is a time difference $d_n$ equivalent to a delay time or a waiting time between the wake-up time W of the station 100 and a real receiving time of the first beacon.

Every time of the n times of receiving, the computing part 320 according to the present disclosure computes the waiting time $d_n$ equivalent to the time difference between the wake-up time W of the station 100 and the real receiving time of the first beacon (S420).

As described above, corresponding to naming the beacon being received n times as the first beacon, the following names the waiting time $d_n$ being computed every time of the n times of receiving as a first waiting time d.

The first waiting time d can be computed by various methods: determining the real time of receiving the first beacon, and then computing a difference between the determined time and the wake-up time W of the station 100; or subtracting the wake-up time W and a length of the first beacon or receiving time duration D from a time E of accomplishing receiving the first beacon, etc.

After finishing computing the first waiting time d every time of the n times of receiving, the deriving part 330 according to the present disclosure computes a representative value of the n first waiting times (S430). The setting part 340 according to the present disclosure sets a sum of the first beacon interval and the representative value of the first waiting times as a first wake-up interval of the station 100 (S440).

The representative value of the first waiting times derived by the deriving part 330 can be any one of the n first waiting times, the representative value of the first waiting times is not fixed set, and can be modified according to various parameters such as a user's intentions, precision of tests, etc.

For example, under a condition of more preferring the latter of minimizing a waiting time and stable receiving of a beacon, the deriving part 330 according to the present disclosure derives a minimum value $d_{min}$ within the n first waiting times as the representative value of the first waiting times.

Figure 5C:
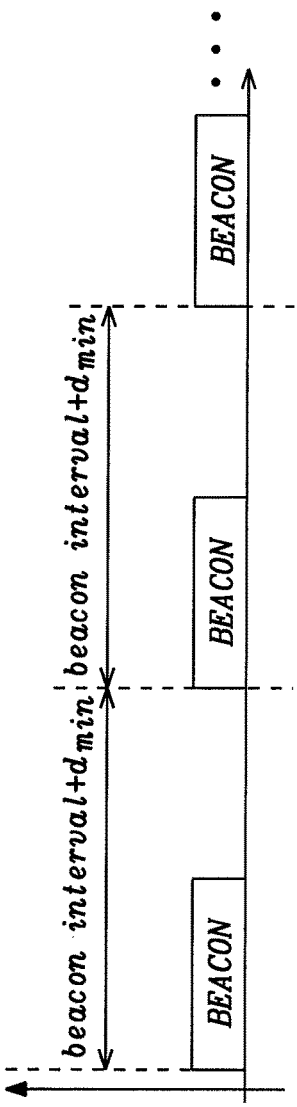
Figure 6:
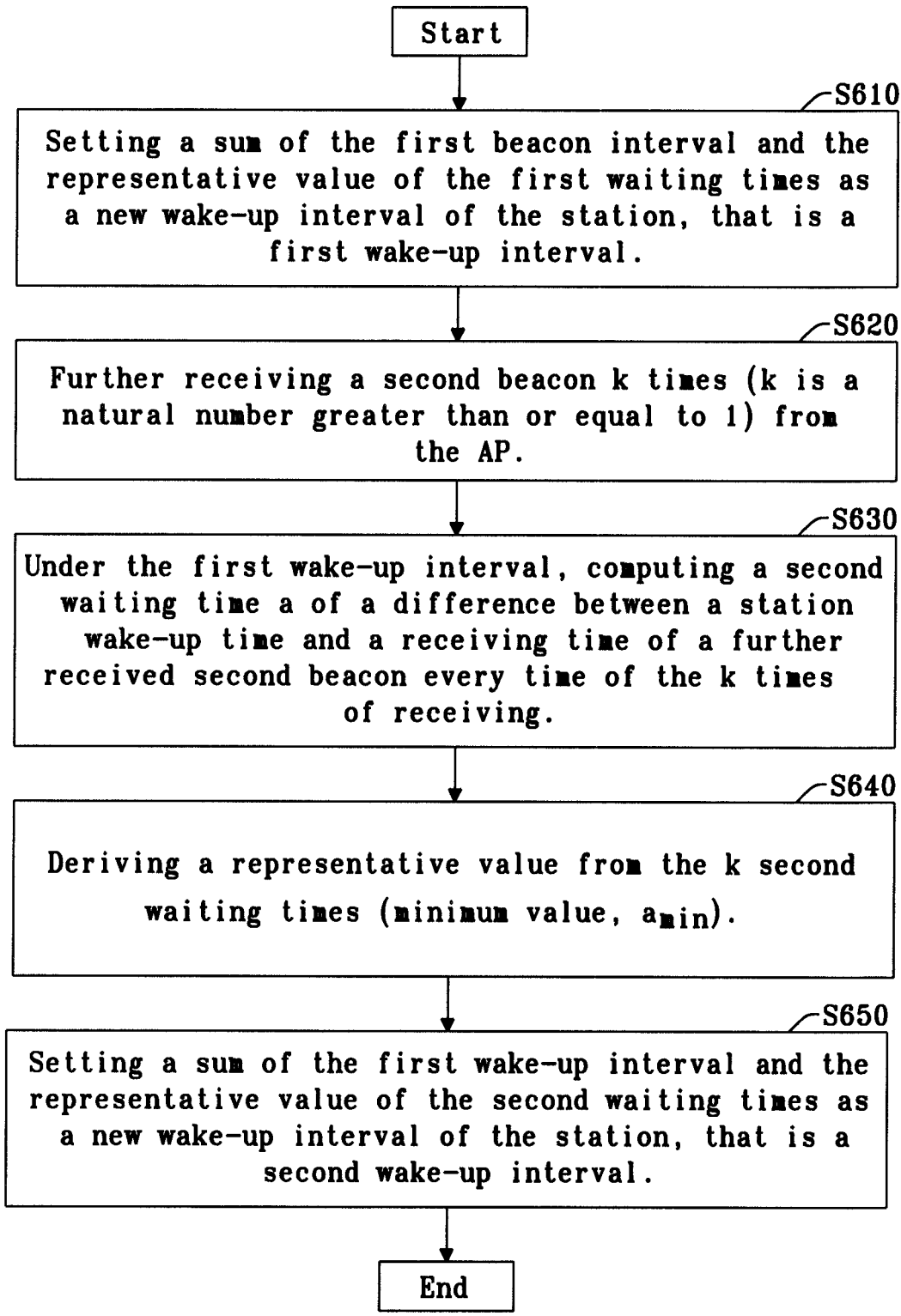
FIG. 6 is a diagram illustrating a receiving part receiving a beacon by a number of times identical to a preset number, according to the present disclosure.

Under the above-mentioned embodiment, as shown in FIG. 5C, in order to set a new wake-up interval of the station 100, a value summed to the first beacon interval is equivalent to a minimum value within the n first waiting times (beacon interval+$d_{min}$).

Using a minimum value ($d_{min}$) within the first waiting times as a representative value can ensure a sufficiently enough time between a real time of receiving the first beacon and a wake-up time of the station 100, and therefore realize stable receiving of a beacon.

As above, the present disclosure repeats n times determining a time difference between the wake-up time W of the station 100 and the real receiving time of the beacon, and based on this, adjusts the wake-up time of the station 100 to a time corresponding to real receiving of the beacon.

Therefore, the present disclosure can effectively resolve problems of increasing of a waiting time caused by transmitting delay of a beacon, and increasing of required power caused by increasing of the waiting time.

FIG. 6-FIG. 10 are diagrams illustrating methods of modifying a wake-up interval of the station 100 according to various embodiments of the present disclosure. The following, referring to FIG. 6-FIG. 10, illustrates technical features of the present disclosure that sets a first wake-up interval based on modifying a representative value of a first waiting time, and makes a wake-up interval of the station 100 more precisely match a real time of receiving a beacon.

As described above, even if the station 100 according to the present disclosure is set to be waked up by an interval (first wake-up interval) that more matches a real transmitting time of a beacon, when other reasons such as wireless communication conditions, processing methods of a time stamp of an AP 110, etc. occur, a problem of inconsistence between a first wake-up interval and a beacon interval still occurs.

In order to eliminate other inconsistence between a first wake-up interval and a beacon interval, the present disclosure prevents or minimizes it by modifying a preset first wake-up interval.

First, as described above, and shown in FIG. 6, after setting a sum of the representative value of the first waiting times and the first beacon interval as a new wake-up interval (first wake-up interval) of the station 100 (S610), the receiving part 310 according to the present disclosure further receives a beacon by a number of times identical to a preset number from the AP 110 (S620).

Herein, the beacon further received by the receiving part 310 is referred as a second beacon to distinguish from the first beacon received n times to derive the first wake-up interval. Furthermore, the preset number of times of the station 100 receiving the second beacon is defined to be a number sufficient to modify a time difference between the wake-up time of the station 100 and a real beacon transmitting time.

Therefore, the preset number of times can be variable according to repeated tests, a user's intentions, etc., and the following names the preset number of times as k (k is a natural number greater than or equal to 1) times.

Every time of the k times of receiving, the computing part 320 according to the present disclosure computes a second waiting time equivalent to a time difference between the wake-up time of the station 100 and a receiving time of the second beacon (S630).

The deriving part 330 according to the present disclosure derives a representative value of the second waiting time based on the k computed second waiting times (S640). The setting part 340 according to the present disclosure sets a sum of the first wake-up interval and the representative value as a new wake-up interval of the station 100, that is, a second wake-up interval, and finishes a process of modifying the wake-up interval (S650).

Herein, same as the above described representative value of the first waiting times, the representative value of the second waiting times can be variably set according to various parameters such as a user's intentions, precision of tests, etc. As an example, a minimum value $a_{min}$ of the second waiting times can be derived as a representative value.

On the other hand, under the first wake-up interval, delay transmitting of the second beacon means the second waiting time is a positive number, and forward transmitting of the second beacon means the second waiting time is a negative number.

The second waiting time being a positive number causes additional power consumption as its magnitude. On the contrary, the second waiting time being a negative number would cause a problem of not being able to receive the second beacon.

Additional power consumption and unstable receiving of a beacon with a same reason of irregular beacon transmitting produce completely different problems (power consumption vs. unstable receiving of a beacon) and are required to be treated distinctively.

Therefore, the present disclosure distinguishes a condition of producing or computing a positive second waiting time and a condition of producing or computing a negative second waiting time, and discloses effective approaches resolving individual conditions produced.

Figure 7:
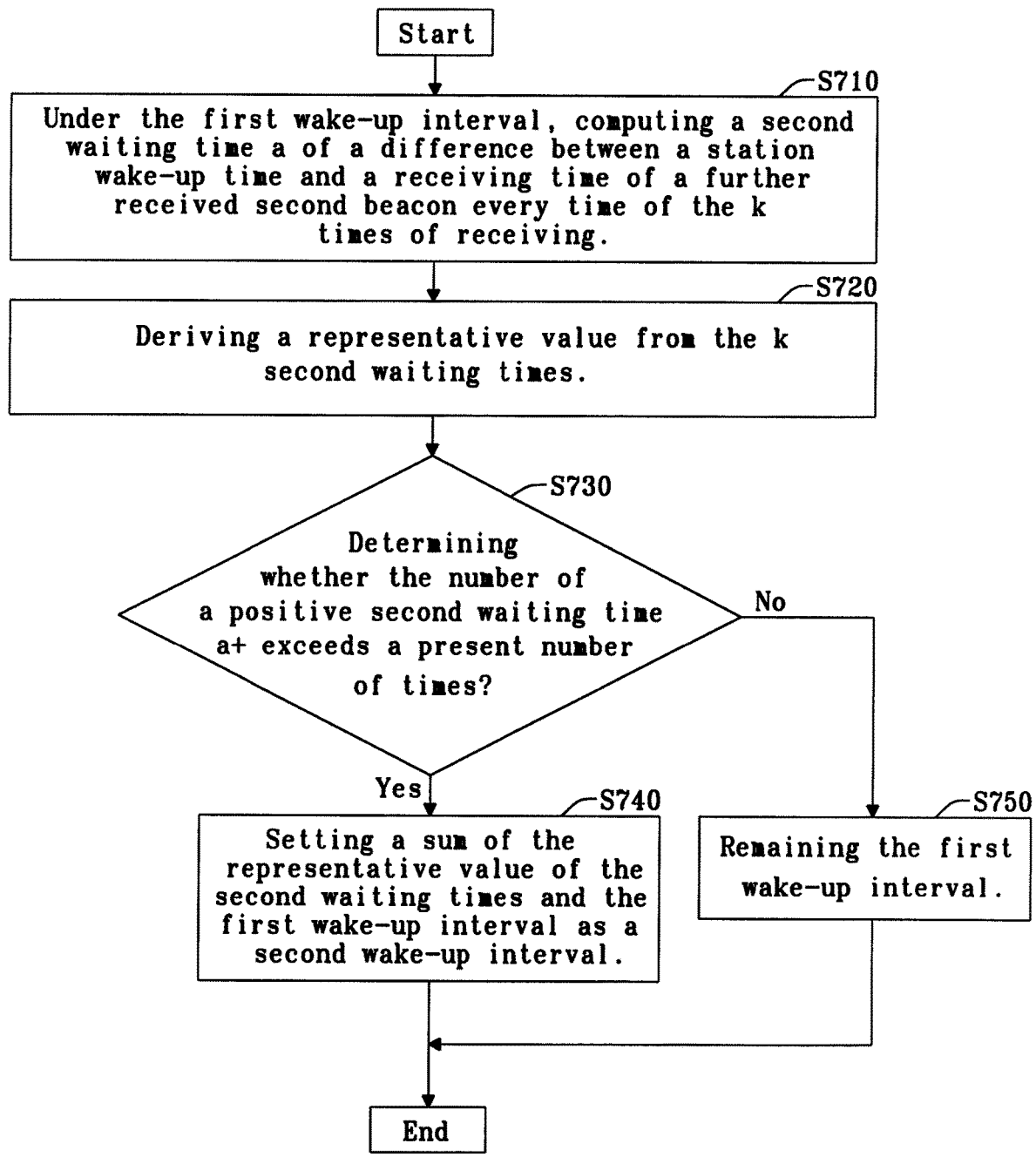
FIG. 7 is a diagram illustrating an approach when a condition of a positive second waiting time occurs, according to the present disclosure.
Figure 8A:
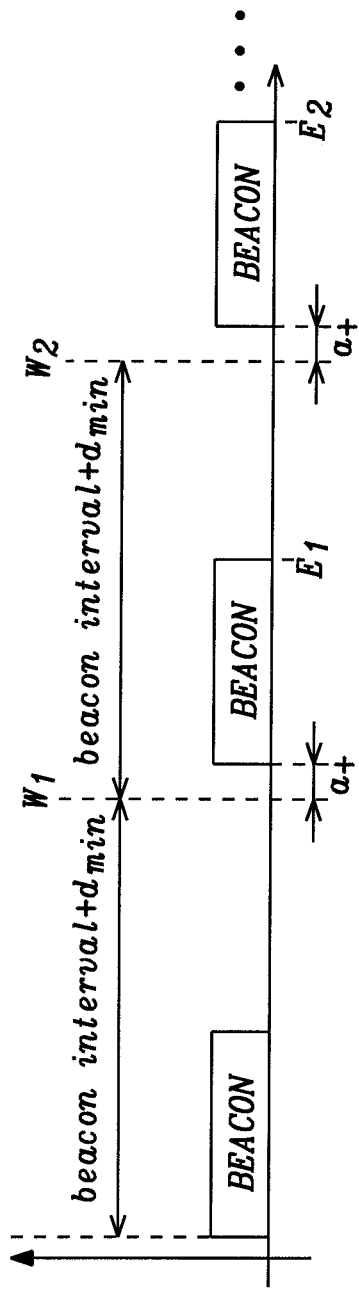
FIG. 8A is a diagram illustrating a process of a computing part computing a second waiting time, according to the present disclosure.
Figure 8B:
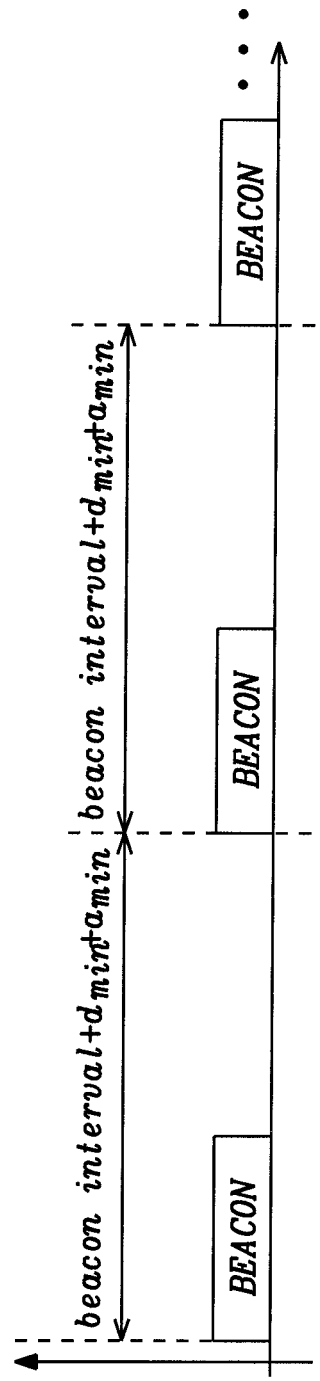
FIG. 8B is a diagram illustrating a setting part setting a sum of a representative value of a second waiting time derived from a deriving part and a first wake-up interval, according to the present disclosure.
Figure 9:
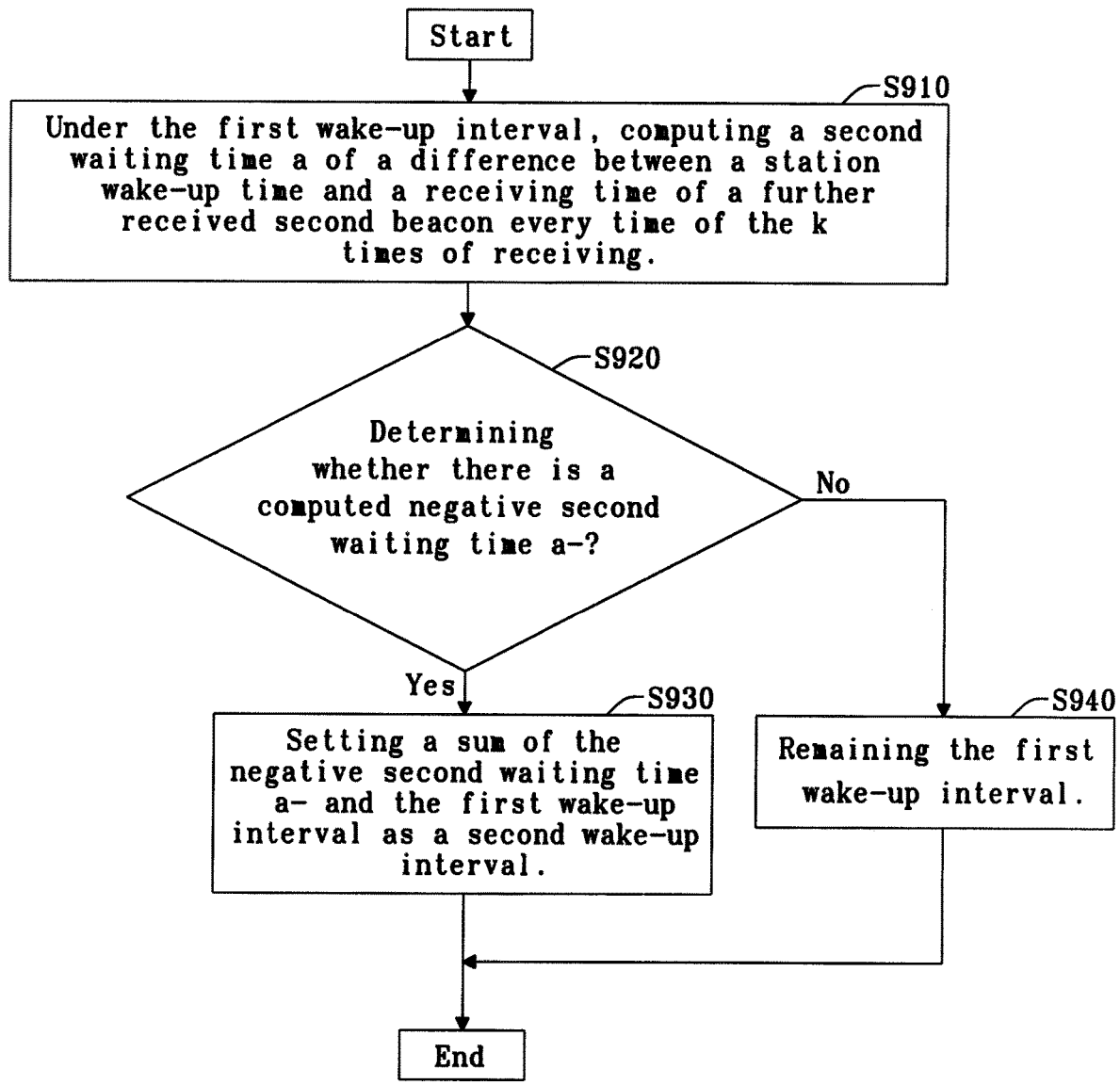
FIG. 9 is a diagram illustrating an approach when a condition of a negative second waiting time occurs, according to the present disclosure.

FIG. 7, FIGS. 8A, and 8B illustrate an approach according to the present disclosure when a condition of a positive second waiting time $a_+$ occurs, and FIG. 9, FIGS. 10A, and 10B illustrate an approach according to the present disclosure when a condition of a negative second waiting time a occurs. The following first illustrates FIG. 7, FIGS. 8A and 8B (positive second waiting time) and then illustrates FIG. 9, FIGS. 10A, and 10B (negative second waiting time).

First, as shown in FIG. 7, a process of the computing part 320 according to the present disclosure which computes the second waiting time ($a_+$ in FIG. 8A) every time of the k times of receiving (S710), and a process of the deriving part 330 according to the present disclosure which derives the representative value of the second waiting time based on the k second waiting times $a_+$ (S720) are performed in the same way as above-mentioned contents.

Before setting a new wake-up interval of the station 100, the setting part 340 according to the present disclosure determines whether a number of times of computing the positive second waiting time $a_+$ exceeds a preset number of times (S730).

Herein, the preset number of times is defined to be a sufficiently necessary number of times to modify a preset wake-up interval of the station 100 as a new wake-up interval, and is variable.

When the number of the computed positive second waiting time $a_+$ exceeds the preset number, it is regarded that inconsistence between the first wake-up interval and a transmitting time of the second beacon occurs an enough number of times. Therefore, the setting part 340 according to the present disclosure sets a sum (beacon interval+$d_{min}$+$a_{min}$), in FIG. 8B, of the representative value of the second waiting time derived from the deriving part 330 and the first wake-up interval (beacon interval+$d_{min}$) as a new wake-up interval of the station 100 (second wake-up interval) (S740).

On the contrary, when the number of the computed positive second waiting time $a_+$ is less than the preset number, the setting part 340 according to the present disclosure does not change the wake-up interval of the station 100 and remains the first wake-up interval already been set (S750).

Using a negative second waiting time a occurred as an example, a process of the computing part 320 according to the present disclosure which computes the second waiting time every time of the k times of receiving (S910) is performed as above described, and shown in FIG. 9.

Before setting a new wake-up interval of the station 100, the setting part 340 according to the present disclosure determines whether there is a negative second waiting time a computed by the computing part 320 (S920).

As described above, if the second beacon is finished transmitting before the station 100 waking up, then the station 100 cannot receive the second beacon, and therefore a negative second waiting time a cannot be computed. Therefore, as shown in FIGS. 10A and 10B, advantageously, the station 100 is required to be previously woke up at a time $W_1$−L before its wake-up time.

Herein, the time $W_1$−L of previously waking up the station 100 is equivalent to a time before a time of previously receiving the second beacon, and expressing in another form, advantageously, L should be a value greater than or equal to the absolute value of the negative second waiting time.

When computing the negative second waiting time $a_-$, the setting part 340 according to the present disclosure sets a sum of the negative second waiting time a and the first wake-up interval (beacon interval+$d_{min}$) as a new wake-up interval of the station 100 (second wake-up interval, beacon interval+$d_{min}$+$a_-$) (S930). That is, a second beacon interval plus the second waiting time $a_-$, and the wake-up time of the station 100 will be modified and shifted to an earlier time with a magnitude (absolute value) same as that of the negative second waiting time $a_-$.

On the contrary, under a condition that the negative second waiting time a is not computed, the setting part 340 according to the present disclosure does not change the wake-up interval of the station 100 and remains the first wake-up interval already been set (S940).

As described above, under a condition that the second waiting time according to the present disclosure is positive, a new wake-up interval is set with a premise that the computing exceeds a preset number of times. On the contrary, under a condition that the second waiting time according to the present disclosure is negative, a new wake-up interval is set without determination of whether the computing times exceeds a preset number of times.

A reason of under the condition that the second waiting time is negative, a new wake-up interval being set without other processes is that a beacon is unable to be received and a problem that wireless communication between the AP 110 and the station 100 cannot ensure necessary or other data occurs.

However, according to an embodiment, obviously, the present disclosure also may set a new wake-up interval after determining whether the computing times exceeds a preset number of times under a condition that the second waiting time is negative.

As above, distinct description of an embodiment when the second waiting is positive and an embodiment when the second waiting is negative is given. However, the two embodiments are not two independent embodiments that cannot be mixed and used with each other, and they are embodiments that can be mixed and used with each other.

For example, the present disclosure basically performs a process of comparing the number of computed positive second waiting time and a preset number of times, and when the second waiting time is negative, sets a wake-up interval of the station 100 as a new wake-up interval.

Furthermore, according to an embodiment, after a process of performing modifying a new wake-up interval because a negative second waiting time occurs, the present disclosure resumes a process (basic process) of comparing the number of computed positive second waiting time and a preset number of times.

Although the steps in the respective flowcharts are described to be sequentially performed, they merely instantiate the technical idea of some embodiments of the present disclosure. Therefore, a person having ordinary skill in the pertinent art could perform the steps by changing the sequences described in the respective drawings or by performing two or more of the steps in parallel, and hence the steps in the respective flowcharts are not limited to the illustrated chronological sequences.

Various implementations of the systems and methods described herein may be realized through digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions to and from a storage system, at least one input device, and at least one output device, wherein the programmable processor may be a special-purpose processor or a general-purpose processor. Computer programs (which are also known as programs, software, software applications or code) contain instructions for a programmable processor and are stored in a "computer-readable recording medium."

The computer-readable recording medium refers to any computer program product, apparatus, and/or device (e.g., non-volatile or non-transitory recording medium such as CD-ROM, ROM, memory card, hard disk, an optical/magnetic disk, storage devices, and the like) used to provide instructions and/or data to a programmable processor.

Various implementations of the systems and techniques described herein can be realized by a programmable computer. Here, the computer includes a programmable processor, a data storage system (including volatile memory, nonvolatile memory, or any other type of storage system or a combination thereof) and at least one communication interface. For example, the programmable computer may be one of a server, a network device, a set-top box, an embedded device, a computer expansion module, a personal computer, a laptop, a personal data assistant (PDA), a cloud computing system, or a mobile device.

Although exemplary embodiments of the present disclosure have been described for illustrative purposes, those skilled in the art will appreciate that various modifications, additions, and substitutions are possible, without departing from the various characteristics of the disclosure. Therefore, exemplary embodiments of the present disclosure have been described for the sake of brevity and clarity. Accordingly, one of ordinary skill would understand that the scope of the disclosure is not limited by the above explicitly described embodiments but by the claims and equivalents thereof.

What is claimed is:

1. A control method of beacon receiving time performed in a station, comprising:
    a receiving stage, receiving one or more first beacons from an access point (AP);
    a computing stage, computing one or more first waiting times of a difference between a station wake-up time for receiving the first beacons and a receiving time of the first beacons;
    a deriving stage, deriving a representative value out of the first waiting times; and
    a setting stage, setting a sum of a first beacon interval and the representative value of the first waiting times as a first wake-up interval of the station.

2. The control method of beacon receiving time as claimed in claim 1, wherein in the deriving stage, a minimum value out of the first waiting times is derived as the representative value of the first waiting times.

3. The control method of beacon receiving time as claimed in claim 1, wherein:
    the receiving stage further receives one or more second beacons from the AP;
    the computing stage, under the first wake-up interval, further computes one or more second waiting times of a difference between the station wake-up time and a receiving time of the second beacons;
    the deriving stage derives a representative value out of the second waiting times;
    the setting stage sets a sum of the first wake-up interval and the representative value of the second waiting times as a second wake-up interval of the station.

4. The control method of beacon receiving time as claimed in claim 3, wherein in the deriving stage, a minimum value out of the second waiting times is derived as the representative value of the second waiting times.

5. The control method of beacon receiving time as claimed in claim 3, wherein in the setting stage, when the number of computed positive second waiting time out of the second waiting times exceeds a preset number of times, a sum of the first wake-up interval and the representative value of the second waiting times is set as the second wake-up interval.

6. The control method of beacon receiving time as claimed in claim 3, wherein in the setting stage, when there is a computed negative second waiting time out of the second waiting times, a sum of the first wake-up interval and the negative second waiting time is set as the second wake-up interval.

7. A station comprising a memory and a processor, wherein a program containing computerized instructions is stored in the memory and configured to be executed by the processor to perform a method, the method, comprising:
    receiving one or more first beacons from an access point (AP);
    computing one or more first waiting times of a difference between a station wake-up time for receiving the first beacons and a receiving time of the first beacons;
    deriving representative value out of the first waiting times; and
    setting a sum of a first beacon interval and the representative value of the first waiting times as a first wake-up interval of the station.

8. The station as claimed in claim 7, wherein the representative value of the first waiting times is a minimum value out of the first waiting times.

9. The station as claimed in claim 7, wherein the method further comprising:
    receiving one or more second beacons from the AP;
    computing , under the first wake-up interval, a second waiting time of a difference between the station wake-up time and a receiving time of the second beacon;
    deriving a representative value out of the second waiting times;
    setting a sum of the first wake-up interval and the representative value of the second waiting times as a second wake-up interval of the station.

10. The station as claimed in claim 9, wherein the representative value of the second waiting times is a minimum value out of the second waiting times.

11. The station as claimed in claim 9, wherein the setting the second wake-up interval comprising:
    when the number of computed positive second waiting time out of the second waiting times exceeds a preset number of times, setting a sum of the first wake-up interval and the representative value of the second waiting times as the second wake-up interval.

12. The station as claimed in claim 9, wherein the setting the second wake-up interval comprising:
    when there is a computed negative second waiting time out of the second waiting times, setting a sum of the first wake-up interval and the negative second waiting time as the second wake-up interval.

* * * * *